June 16, 1964
F. L. BUCHER
3,137,391
AUXILIARY LINK STRUCTURE
Filed Feb. 15, 1962
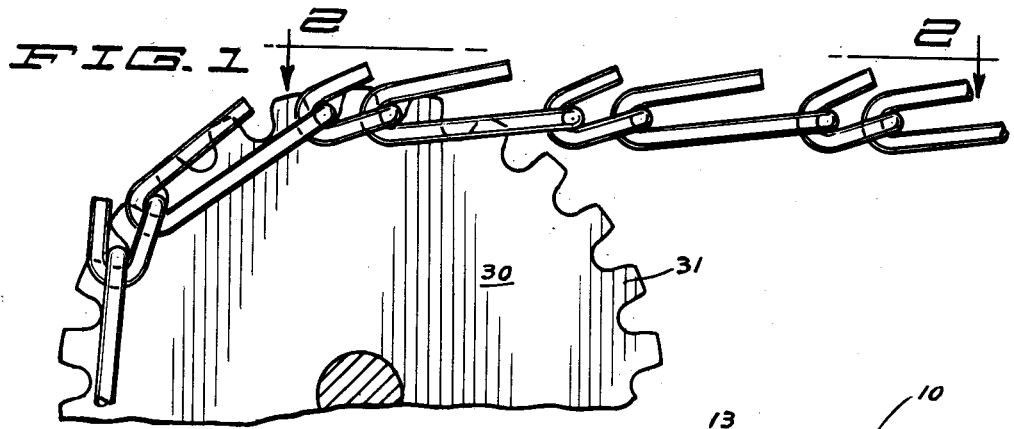
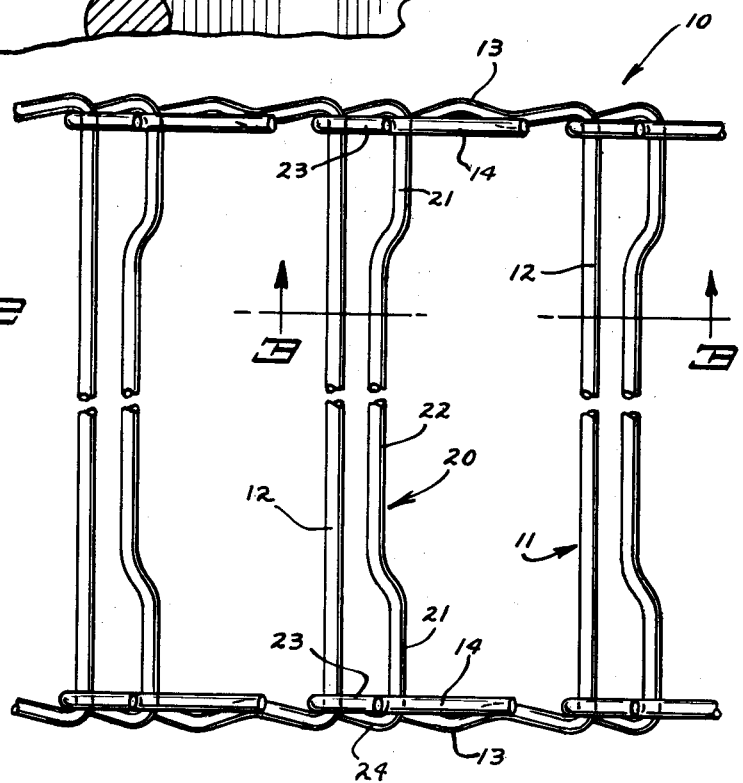
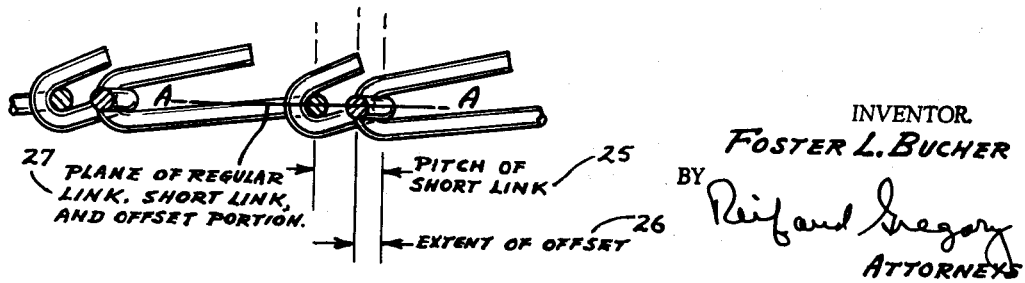
INVENTOR.
FOSTER L. BUCHER
BY
ATTORNEYS United States Patent Office 3,137,391
Patented June 16, 1964

1

3,137,391
AUXILIARY LINK STRUCTURE
Foster L. Bucher, Cambridge, Minn., assignor to Dahlman Manufacturing & Sales, Inc., Braham, Minn., a corporation of Minnesota
Filed Feb. 15, 1962, Ser. No. 173,487
1 Claim. (Cl. 209—84)

This invention has to do with improvement in the link structure of a conveyor chain of the type used in connection with a potato harvester. Particular reference is had here to an extended pitch overhead chain. This chain is used to carry off vines and large clods and discharge the same at one side of the potato harvester while potatoes fall through the openings between the links onto a delivery conveyor therebelow for discharge into suitable receptacles.

The extended pitch in the chain is used to provide a sufficient opening or spacing between adjacent links to permit potatoes to fall through. A triple extended pitch is used in the chain and this is the maximum practical limit to which the links in the chain may be extended without requiring a change in the size of the sprockets being used. With the spacing indicated, the majority of potatoes will fall through between the links. However a great quantity of jumbo potatoes are harvested and these potatoes are of a size too large to pass between the links.

Therefore to accommodate jumbo sized potatoes, it is desirable and it is an object of this invention to widen the spacing between adjacent links without having to change the sprockets being used.

It is another object of this invention in connection with an extended pitch chain to provide a short link between adjacent extended links to increase the otherwise spacing between said extended links.

It is a more specific object of this invention to provide for the insertion of a link between adjacent links of a conveyor chain, said inserted link having a dodged or offset central rod portion to provide a wider spacing than otherwise, said dodged portion being disposed in the plane of the adjacent links with reference to the top run of the conveyor with said inserted link having a lesser extended pitch than that of the adjacent links.

These and other objects and advantages of the invention will be fully set forth in the following description made in connection with the accompanying drawings in which like reference characters refer to similar parts throughout the several views and in which:

FIG. 1 is a fragmentary view in side elevation showing applicant's device in operating position;

FIG. 2 is a broken view in top plan taken on line 2—2 of FIG. 1, as indicated by the arrows; and FIG. 3 is a broken view in vertical section taken on line 3—3 of FIG. 2, as indicated by the arrows.

Referring to the drawing, a conveyor chain 10 is shown, and in FIG. 1 said chain is shown in operating position relative to sprocket 30 and the sprocket teeth 31. Said sprocket is indicative of and is intended to represent the pairs of axially spaced sprockets over which the conveyor chain passes. A sufficient portion of said chain is shown to illustrate the applicant's invention.

Said chain 10 is shown comprising an extended link chain and more particularly comprising links 11 which in the present embodiment are shown having a triple extended pitch. In actual practice relative to the size of sprocket commonly used, the extended pitch here indicated represents a pitch of 4.52 inches.

Said extended link 11 comprises an elongated straight transverse bar 12, with said bar having rearwardly angle arm portions 13 here shown to be transversely convoluted at intervals representing a single pitch of said sprocket. Said convolutions cause the extended arm portions 13 to more closely than otherwise hug the sides of the sprocket.

The free end portions of said arms 13 are reversely curved to extend over said arm portions and form hook portions 14.

The link 11 is a commonly used type of extended link to form an overhead conveyor in connection with a potato harvester to carry off vines and large clods of dirt. The extended pitch of the link structure is intended to provide sufficient space between the links for potatoes to fall through to a delivery conveyor. The openings normally provided in said conveyor are of adequate size for the majority of potatoes but are not adequate to permit jumbo sized potatoes to fall through. The use of a chain with a more extended pitch than indicated would cause an operating difficulty and would necessitate a change in the size of sprockets used. As a practical thing, it is desirable not to disturb the sprockets being used but to accommodate the chain to the sprockets.

Applicant therefore provides a link 20 to be inserted between the adjacent of links 11. Said link 20 comprises a straight central transverse rod portion 22 which is dodged or offset relative to the straight relatively short end portions 21 at either end thereof. Said offset portion will be substantially on the order of five-sixths of the width of the link, or in other words of the conveyor chain.

Said straight end portions 21 at their free end portions are rearwardly and inwardly angled to form arm portions 24 of a length to form a single pitch relative to said sprocket. Said arms have reversely upwardly curved hook portions 23.

The offset or dodged portion 22 and the end portions 21 at either end thereof are disposed in the same plane as the adjacent straight rod portions 12 with reference to a horizontal run of the conveyor 10.

The arm 24, as indicated in FIGS. 1 and 3, is angled a certain degree relative to the plane of the portions 21 and 22 to position these portions into the same plane as of the adjacent straight rod portions 12. This is indicated by the line A—A in FIG. 3 and by the legend indicated by the reference numeral 27.

Referring to FIG. 2, the distance between the adjacent links 11 without an intervening link would be represented by the distance between the rods 12. This distance as shown with the insertion of a link 20 is increased by the extent of the offset of the central portion 22 of said link 20, with the extent of the offset in the present embodiment being indicated by the reference numeral 26 in FIG. 3. The pitch of link 20 is indicated by the reference numeral 25.

Thus the distances between adjacent of the links 11 of the conveyor 10 are materially increased with the insertions of applicant's novel link structure 20 and said links 20 are formed having the pitch of the sprocket used whereby the conveyor belt retains a pitch which is compatible with pitch of the sprockets commonly used as illustrated in FIG. 1.

It will of course be understood that various changes may be made in the form, details, arrangement and proportions of the parts, without departing from the scope of applicant's invention which, generally stated, consists in a structure capable of carrying out the objects above set forth, in the parts and combinations of parts disclosed and defined in the appended claim.

What is claimed is:

An auxiliary link structure in connection with an endless link conveyor chain of the type indicated carried on a sprocket having in combination, a plurality of links each comprising a straight rod portion having rearwardly extended arm portions, each of said arm portions having a length equivalent to the length of the pitch of said sprocket extended a certain number of times, said auxiliary link comprising a rod having a portion offset in a direction away from the link preceding it in said chain, said auxiliary link having rearwardly extended arm portons, each of said arm portions having a length equivalent to the length of the pitch of said sprocket, said auxiliary link being disposed between adjacent of said first links, said offset portion being disposed in the plane of said straight rod portions in the horizontal run portion of said conveyor chain, and means connecting said links.

References Cited in the file of this patent

UNITED STATES PATENTS

| | | |
|---|---|---|
| 985,107 | Briggs | Feb. 21, 1911 |
| 1,715,218 | Wright | May 28, 1929 |

FOREIGN PATENTS

| | | |
|---|---|---|
| 216,703 | Australia | Aug. 22, 1958 |